(12) United States Patent
Mokdad (10) Patent No.: US 10,774,736 B2
(45) Date of Patent: Sep. 15, 2020

(54) V6 CRANKSTAR AND FIRING SEQUENCES

(71) Applicant: LIEBHERR-COMPONENTS COLMAR SAS, Colmar (DE)

(72) Inventor: Bechir Mokdad, Colmar (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 0 days.

(21) Appl. No.: 16/319,071

(22) PCT Filed: Jul. 18, 2017

(86) PCT No.: PCT/EP2017/000878
§ 371 (c)(1),
(2) Date: Jan. 18, 2019

(87) PCT Pub. No.: WO2018/015015
PCT Pub. Date: Jan. 25, 2018

(65) Prior Publication Data
US 2019/0249598 A1    Aug. 15, 2019

(30) Foreign Application Priority Data

Jul. 18, 2016 (DE) .................. 10 2016 008 682
Jan. 27, 2017 (DE) .................. 10 2017 000 778

(51) Int. Cl.
*F02B 75/18*  (2006.01)
*F02B 75/22*  (2006.01)
*F16F 15/24*  (2006.01)
*F16C 3/06*   (2006.01)

(52) U.S. Cl.
CPC ............... *F02B 75/22* (2013.01); *F16C 3/06* (2013.01); *F16F 15/24* (2013.01); *F02B 2075/1864* (2013.01)

(58) Field of Classification Search
CPC .... F02B 2075/1864; F02B 75/22; F16F 15/24
(Continued)

(56) References Cited

U.S. PATENT DOCUMENTS 1,776,760 A   9/1930   Barkeij
3,748,850 A   7/1973   von Hoevel et al.
(Continued)

FOREIGN PATENT DOCUMENTS

GB          551406 A   2/1943

OTHER PUBLICATIONS

ISA European Patent Office, International Search Report and Written Opinion Issued in Application No. PCT/EP2017/000878, Nov. 17, 2017, WIPO, 17 pages.

*Primary Examiner* — George C Jin
*Assistant Examiner* — Teuta B Holbrook
(74) *Attorney, Agent, or Firm* — McCoy Russell LLP

(57) ABSTRACT

The present invention comprises a V-type 4-stroke internal combustion engine with 16 cylinders, having a counterclockwise direction of rotation, comprising a firing sequence controller that fires the cylinders A1 to A8 and B1 to B8 in at least one of the following firing sequences, wherein the direction of rotation and the cylinder numbering is defined in accordance with DIN ISO 1204:

a) A1-B7-A2-B6-A3-B5-A5-B1-A8-B2-A7-B3-A6-B4-A4-B8
b) A1-B7-A2-B6-A6-B4-A5-B1-A8-B2-A7-B3-A3-B5-A4-B8
c) A1-B7-A2-B5-A4-B3-A6-B1-A8-B2-A7-B4-A5-B6-A3-B8
d) A1-B4-A4-B6-A3-B7-A2-B8-A8-B5-A5-B3-A6-B2-A7-B1
e) A1-B5-A5-B3-A6-B2-A7-B1-A8-B4-A4-B6-A3-B7-A2-B8.

and further shows a corresponding engine having a clockwise direction of rotation, comprising a firing sequence controller that fires the cylinders A1 to A8 and B1 to B8 in at least one of the following firing sequences:

(Continued)

a) B1-A7-B2-A6-B3-A5-B5-A1-B8-A2-B7-A3-B6-A4-B4-A8
b) B1-A7-B2-A6-B6-A4-B5-A1-B8-A2-B7-A3-B3-A5-B4-A8
c) B1-A7-B2-A5-B4-A3-B6-A1-B8-A2-B7-A4-B5-A6-B3-A8
d) B1-A4-B4-A6-B3-A7-B2-A8-B8-A5-B5-A3-B6-A2-B7-A1
e) B1-A5-B5-A3-B6-A2-B7-A1-B8-A4-B4-A6-B3-A7-B2-A8.

18 Claims, 9 Drawing Sheets

(58) Field of Classification Search
USPC .............. 123/54.4, 54.8, 55.7, 481, 198 DB, 123/198 DC, 198 F
See application file for complete search history.

(56) References Cited

U.S. PATENT DOCUMENTS

| | | | |
|---|---|---|---|
| 5,826,563 | A | 10/1998 | Patel et al. |
| 6,360,724 | B1* | 3/2002 | Suhre ...................... F02D 17/02 123/198 F |
| 7,979,193 | B2* | 7/2011 | Harbert ............... F02D 41/0087 123/54.8 |
| 2008/0078359 | A1* | 4/2008 | Barrett .................... F02P 5/152 123/406.37 |
| 2013/0006497 | A1 | 1/2013 | Silvers et al. |
| 2014/0069178 | A1* | 3/2014 | Beikmann ............... G01L 23/22 73/114.07 |
| 2014/0069381 | A1* | 3/2014 | Beikmann ........... F02D 41/0087 123/406.12 |
| 2016/0003169 | A1* | 1/2016 | Leone ................ F02D 41/3017 123/481 |
| 2017/0191411 | A1* | 7/2017 | Henninger ............. F02B 75/02 |

* cited by examiner

Fig. 12 – Crank star configurations for counter-clockwise rotation

CS i: 0 – 270 – 180 – 90 – 90 – 180 – 270 – 0

CS ii: 0 – 90 – 180 – 270 – 270 – 180 – 90 – 0

CS iii: 0 – 90 – 270 – 180 – 180 – 270 – 90 – 0

Fig. 13 – Crank star configurations for clockwise rotation

<u>CS i:</u> 0 – 90 – 180 – 270 – 270 – 180 – 90 – 0

<u>CS ii:</u> 0 – 270 – 180 – 90 – 90 – 180 – 270 – 0

<u>CS iii:</u> 0 – 270 – 90 – 180 – 180 – 90 – 270 – 0

Fig. 14 - Firing sequences for counter-clockwise rotation

Crankstar CS ii)

a)     A1-B7-A2-B6-A3-B5-A5-B1-A8-B2-A7-B3-A6-B4-A4-B8
b)     A1-B7-A2-B6-A6-B4-A5-B1-A8-B2-A7-B3-A3-B5-A4-B8

Crankstar CS iii)

c)     A1-B7-A2-B5-A4-B3-A6-B1-A8-B2-A7-B4-A5-B6-A3-B8

Crankstar CS i)

d)     A1-B4-A4-B6-A3-B7-A2-B8-A8-B5-A5-B3-A6-B2-A7-B1
e)     A1-B5-A5-B3-A6-B2-A7-B1-A8-B4-A4-B6-A3-B7-A2-B8.

Fig. 15 - Firing sequences for clockwise rotation

Crankstar CS ii)

a)     B1-A7-B2-A6-B3-A5-B5-A1-B8-A2-B7-A3-B6-A4-B4-A8
b)     B1-A7-B2-A6-B6-A4-B5-A1-B8-A2-B7-A3-B3-A5-B4-A8

Crankstar CS iii)

c)     B1-A7-B2-A5-B4-A3-B6-A1-B8-A2-B7-A4-B5-A6-B3-A8

Crankstar CS i)

d)     B1-A4-B4-A6-B3-A7-B2-A8-B8-A5-B5-A3-B6-A2-B7-A1
e)     B1-A5-B5-A3-B6-A2-B7-A1-B8-A4-B4-A6-B3-A7-B2-A8.

V6 CRANKSTAR AND FIRING SEQUENCES

CROSS-REFERENCE TO RELATED APPLICATION

The present application is a U.S. National Phase of International Patent Application Serial No. PCT/EP2017/000878 entitled "V-TYPE 4-STROKE INTERNAL COMBUSTION ENGINE WITH 16 CYLINDERS," filed on Jul. 18, 2017. International Patent Application Serial No. PCT/EP2017/000878 claims priority to German Patent Application No. 10 2016 008 682.3, filed on Jul. 18, 2016 and German Patent Application No. 10 2017 000 778.0, filed on Jan. 27, 2017. The entire contents of each of the above-cited applications are hereby incorporated by reference in their entirety for all purposes.

TECHNICAL FIELD

The present invention relates to a V-type 4-stroke internal combustion engine with 16 cylinders, having a counter-clockwise or a clockwise direction of rotation.

BACKGROUND AND SUMMARY

This object is solved by the subject matter of independent claims 1 to 3. The dependent claims relate to possible embodiments of the invention.

This object is solved by a V-type 4-stroke internal combustion engine with 16 cylinders, having a counter-clockwise direction of rotation, comprising a firing sequence controller that fires the cylinders A1 to A8 and B1 to B8 in at least one of the following firing sequences, wherein the direction of rotation and the cylinder numbering is defined in accordance with DIN ISO 1204: a) A1-B7-A2-B6-A3-B5-A5-B1-A8-B2-A7-B3-A6-B4-A4-B8
  b) A1-B7-A2-B6-A6-B4-A5-B1-A8-B2-A7-B3-A3-B5-A4-B8
  c) A1-B7-A2-B5-A4-B3-A6-B1-A8-B2-A7-B4-A5-B6-A3-B8
  d) A1-B4-A4-B6-A3-B7-A2-B8-A8-B5-A5-B3-A6-B2-A7-B1
  e) A1-B5-A5-B3-A6-B2-A7-B1-A8-B4-A4-B6-A3-B7-A2-B8; or
a V-type 4-stroke internal combustion engine with 16 cylinders, having a clockwise direction of rotation, comprising a firing sequence controller that fires the cylinders A1 to A8 and B1 to B8 in at least one of the following firing sequences, wherein the direction of rotation and the cylinder numbering is defined in accordance with DIN ISO 1204:
  a) B1-A7-B2-A6-B3-A5-B5-A1-B8-A2-B7-A3-B6-A4-B4-A8
  b) B1-A7-B2-A6-B6-A4-B5-A1-B8-A2-B7-A3-B3-A5-B4-A8
  c) B1-A7-B2-A5-B4-A3-B6-A1-B8-A2-B7-A4-B5-A6-B3-A8
  d) B1-A4-B4-A6-B3-A7-B2-A8-B8-A5-B5-A3-B6-A2-B7-A1
  e) B1-A5-B5-A3-B6-A2-B7-A1-B8-A4-B4-A6-B3-A7-B2-A8, or
a V-type 4-stroke internal combustion engine having 16 cylinders, having a counter-clockwise or clockwise direction of rotation, comprising a crankshaft, a torsional vibration damper and a flywheel arranged on the crankshaft, wherein the crankshaft has 8 crank throws forming a crank star, wherein in each case the piston rods of the two cylinders of a V-segment are connected to the same crank throw, wherein the crank star is of the lengthwise symmetric or lengthwise quasi-symmetric type, wherein the crank throws C1 to C8 have one of the following angular sequences in the direction of rotation of the engine when seen from the side of the flywheel, with the crank throws numbered as C1 to C8 when starting from the side of the flywheel:
  i) C1,C8-C2,C7-C3,C6-C4,C5
  ii) C1,C8-C4,C5-C3,C6-C2,C7
  iii) C1,C8-C3,C6-C4,C5-C2,C7,
The dependent claims relate to possible embodiments of the invention.

In a first aspect, the present invention provides a V-type 4-stroke internal combustion engine with 16 cylinders, having a counter-clockwise direction of rotation, comprising a firing sequence controller that fires the cylinders A1 to A8 and B1 to B8 in at least one of the following firing sequences, wherein the direction of rotation and the cylinder numbering is defined in accordance with DIN ISO 1204:
  a) A1-B7-A2-B6-A3-B5-A5-B1-A8-B2-A7-B3-A6-B4-A4-B8
  b) A1-B7-A2-B6-A6-B4-A5-B1-A8-B2-A7-B3-A3-B5-A4-B8
  c) A1-B7-A2-B5-A4-B3-A6-B1-A8-B2-A7-B4-A5-B6-A3-B8
  d) A1-B4-A4-B6-A3-B7-A2-B8-A8-B5-A5-B3-A6-B2-A7-B1
  e) A1-B5-A5-B3-A6-B2-A7-B1-A8-B4-A4-B6-A3-B7-A2-B8.

In a second aspect, the present invention provides a V-type 4-stroke internal combustion engine with 16-cylinders, having a clockwise direction of rotation, comprising a firing sequence controller that fires the cylinders A1 to A8 and B1 to B8 in at least one of the following firing sequences, wherein the direction of rotation and the cylinder numbering is defined in accordance with DIN ISO 1204:
  a) B1-A7-B2-A6-B3-A5-B5-A1-B8-A2-B7-A3-B6-A4-B4-A8
  b) B1-A7-B2-A6-B6-A4-B5-A1-B8-A2-B7-A3-B3-A5-B4-A8
  c) B1-A7-B2-A5-B4-A3-B6-A1-B8-A2-B7-A4-B5-A6-B3-A8
  d) B1-A4-B4-A6-B3-A7-B2-A8-B8-A5-B5-A3-B6-A2-B7-A1
  e) B1-A5-B5-A3-B6-A2-B7-A1-B8-A4-B4-A6-B3-A7-B2-A8.

The firing sequences were obtained by multi-criteria hierarchical analysis.

Preferably, the engines according to the first and/or second aspect comprise a crankshaft having 8 crank throws forming a crank star, wherein in each case the piston rods of the two cylinders of a V-segment are connected to the same crank throw, wherein the crank star is preferably of the lengthwise symmetric or lengthwise quasi-symmetric type.

In a third aspect, the present invention provides a V-type 4-stroke internal combustion engine having 16 cylinders, having a counter-clockwise or clockwise direction of rotation, comprising a crankshaft, a torsional vibration damper and a flywheel arranged on the crankshaft, wherein the crankshaft has 8 crank throws forming a crank star, wherein in each case the piston rods of the two cylinders of a V-segment are connected to the same crank throw, wherein the crank star is of the lengthwise symmetric or lengthwise quasi-symmetric type, wherein the crank throws C1 to C8 have one of the following angular sequences in the direction of rotation of the engine when seen from the side of the flywheel, with the crank throws numbered as C1 to C8 when starting from the side of the flywheel:

i) C1,C8-C2,C7-C3,C6-C4,C5
ii) C1,C8-C4,C5-C3,C6-C2,C7
iii) C1,C8-C3,C6-C4,C5-C2,C7.

These crank stars have advantageous dynamic behaviors, especially with respect to axial vibrations. Further, advantageous firing sequences can be found for these crank stars.

A specific angular sequence of the crank throws in the direction of rotation of the engine means that if one moves around the static crankstar in the direction of rotation, one encounters the crank throws in this sequence. This also means that if one turns the crank star in the direction of rotation, the crank throws will pass a fixed angle in the opposite sequence. The same principle of course also applies if the direction of rotation is specified as clockwise or anti-clockwise.

If two crank throws are included in the sequence as a couple, such as C1,C8, this means that they have the same or approximately the same angular position, depending on whether the crank-star is of the symmetric and the quasi-symmetric type. The order of notation of the two crank throws within the couple does not imply a required angular sequence between these two crank throws for quasi-symmetric type.

The first to third aspect can be realized independently. Preferably, however, a firing sequence according to the first or the second aspect is combined with a crank star according to the third aspect.

In particular, the present invention comprises a V-type 4-stroke internal combustion engine having the features according to a combination of the first aspect with the third aspect, or having the features according to a combination of the second aspect with the third aspect.

In each case, preferably, the combination of firing sequence and crank star is one of the following:
crank star i), one of the firing sequences d or e
crank star ii), one of the firing sequences a or b
crank star iii), firing sequence c.

Possible embodiments of a V-type 4-stroke internal combustion engine according to any one of the first to third aspect or a combination of these aspects are described in the following:

In an embodiment of the invention, the V-angle of the V-type 4-stroke internal combustion engine of the present invention is between 40° and 80°, more preferably between 50° and 70°, more preferably between 55° and 65°, most preferably at 60°.

As described above, the crank star of the engine is preferably of the lengthwise symmetric or quasi-symmetric type. Lengthwise symmetric means that two crank throws having the same distance from the middle plane of the crankshaft have the same angular position. Lengthwise quasi-symmetric means that certain deviations from an exactly symmetric position are possible. Preferably, in this case, the angular difference between two crank throws having the same distance from the middle plane of the crankshaft is below 5°, preferably below 3°, more preferably below 1°.

In an embodiment of the invention, on both halves of the crankshaft, the angular distance between two crank throws following each other is between 80° and 100° or between 170° and 190°, preferably between 85° and 95° or between 175° and 185°, more preferably between 89° and 91° or between 179° and 181° and most preferably at 90° or 180°.

In an embodiment of the invention, the firing sequences have, for the counter-clockwise direction of rotation, an angular firing distance for a firing of a cylinder of the B-bank followed by a firing of a cylinder of the A-bank of between 45° and 75°, preferably between 55° and 65°, most preferably at 60° and/or the firing sequences have, for the counter-clockwise direction of rotation, an angular firing distance for a firing of a cylinder of the A-bank followed by a firing of a cylinder of the B-bank of between 15° and 45°, preferably between 25° and 35°, most preferably at 30°.

In an embodiment of the invention, the firing sequences have, for the clockwise direction of rotation, an angular firing distance for a firing of a cylinder of the A-bank followed by a firing of a cylinder of the B-bank of between 45° and 75°, preferably between 55° and 65°, most preferably at 60° and/or the firing sequences have, for the clockwise direction of rotation, an angular firing distance for a firing of a cylinder of the B-bank followed by a firing of a cylinder of the A-bank of between 15° and 45°, preferably between 25° and 35°, most preferably at 30°.

In an embodiment of the invention, the crank shaft is made from a self-ageing, micro-alloyed steel. This is made possible by the lower vibrations provided by the present invention.

In an embodiment of the invention, the engine comprises a torsional vibration damper.

Preferably, the power dissipation of the torsional vibration damper is below 6 per mil of the maximum engine power, more preferably below 5 per mil, more preferably below 3.5 per mil, more preferably below 2.5 per mil, most preferably below 2 per mil.

In an embodiment of the invention, the torsional vibration damper is a viscous damper.

In an embodiment of the invention, the torsional vibration damper is arranged on the opposite side of the crankshaft from the flywheel.

In an embodiment of the invention, the displacement volume per cylinder is between 2 l and 15 l, preferably between 4 l and 12 l, more preferably between 5 l and 9 l.

In an embodiment of the invention, the maximum engine power per liter displacement volume is between 10 kW and 80 kW, preferably between 20 kW and 50 kW.

In an embodiment of the invention, the engine has an operating speed range of between 600 and 2100 rpm.

In an embodiment of the invention, the engine has an engine controller programmed to run the engine at a constant nominal operating speed, wherein the constant nominal operating speed preferably can be adapted based on engine conditions and/or load conditions, and/or the constant nominal operating speed preferably is from an operating speed range between 600 and 2100 rpm.

In an embodiment of the invention, the engine is operable with a gaseous and/or with a liquid fuels, wherein the engine can preferably be operated with at least one of the following fuels: gas, diesel, gasoline.

In an embodiment of the invention, the engine has a direct injection system and/or a high pressure injection system.

In an embodiment of the invention, the engine can be operated with a Diesel or an Otto combustion method.

In an embodiment of the invention, the engine controller is programmed to operate the engine with a homogeneous charge and/or stratified charge combustion method.

In an embodiment of the invention, the engine is a suction engine or has a charging system having one or several stages.

In an embodiment of the invention, all cylinders of one cylinder bank have a common intake manifold and/or a common exhaust manifold, wherein the exhaust manifolds are preferably arranged with respect to the V-angle on the inside and the intake manifolds are arranged with respect to the V-angle on the outside.

In an embodiment of the invention, the engine is used as a power unit in a heavy duty and/or mining and/or earth moving and/or transport and/or cargo and/or load handling machine, preferably for an excavator and/or an dumper truck.

In an embodiment of the invention, the engine is used to run a generator and/or a hydraulic pump, the generator and/or the hydraulic pump preferably operating one or more drives of an undercarriage and/or working equipment, preferably of a heavy duty and/or mining and/or earth moving and/or transport and/or cargo and/or load handling machine, preferably for an excavator and/or an dumper truck.

In an embodiment of the invention, the engine is coupled directly or via a mechanical gear train to an undercarriage and/or working equipment, preferably of a heavy duty and/or mining and/or earth moving and/or transport and/or cargo and/or load handling machine, preferably for an excavator and/or an dumper truck.

In an embodiment of the invention, the engine is used as the main power unit for a ship and/or a train.

In an embodiment of the invention, the engine is used as a power unit in military equipment and/or for fluid transport and/or for gas and/or fuel production and/or treatment.

In an embodiment of the invention, the engine is used as a power unit for power generation, an in particular drives a generator.

In an embodiment of the invention, the engine is used as a power unit for a mobile and/or stationary machine.

In an embodiment of the invention, the engine is coupled torsionally stiffly and/or via a torsionally elastic coupling to the load.

The present invention further comprises a machine comprising a V-type 4-stroke internal combustion engine according to any one of the above described aspects and/or embodiments. Preferably, the machine and/or the engine has one, more or all the features described above.

In particular, the machine can be a stationary or mobile machine, in particular a heavy duty and/or mining and/or earth moving and/or transport and/or cargo and/or load handling machine, and/or ship and/or train and/or military and/or fluid transport and/or gas and/or oil production and/or treatment machine and/or power generator. Preferably the machine is an excavator and/or an dumper truck.

The present invention further comprises a crank star for a V-type 4-stroke internal combustion engine according to any one of the above described aspects and/or embodiments. Preferably, the machine and/or the engine has one, more or all the features described above.

In particular, the crank star is for a V-type 4-stroke internal combustion engine having 16 cylinders, and is formed by 8 crank throws arranged on a crankshaft, wherein in each case the piston rods of the two cylinders of a V-segment can be connected to the same crank throw, wherein the crank star is of the lengthwise symmetric or lengthwise quasi-symmetric type, wherein the crank throws C1 to C8 have one of the following angular sequences in one direction of rotation when seen from one side of the crankshaft, with the crank throws numbered as C1 to C8 when starting from the side of the flywheel:

i) C1,C8-C4,C5-C3,C6-C2,C7
ii) C1,C8-C2,C7-C3,C6-C4,C5
iii) C1,C8-C2,C7-C4,C5-C3,C6.

Further, a torsional vibration damper and/or a flywheel can be arranged on the crankshaft.

Preferably, the angular sequences provided above is realized in the direction of rotation of the engine and/or when seen from the side of the flywheel.

The present invention further comprises firing sequence controller or a software for a V-type 4-stroke internal combustion engine with 16 cylinders, in particular for a V-type 4-stroke internal combustion engine according to any of the preceding claims, the firing sequence controller or software implementing at least one of the firing sequences provided above.

The present invention further comprises method for operating a V-type 4-stroke internal combustion engine with 16 cylinders, wherein the engine is operated with at least one out of the firing sequences provided above.

Preferably, the method and/or the engine has one, more or all the features described above.

Preferably, the method is a method of operation of a V-type 4-stroke internal combustion engine according to any one of the above described aspects and/or embodiments.

BRIEF DESCRIPTION OF THE FIGURES

The present invention will now be described in more detail with respect to particular embodiments and figures.

The figures shows

DETAILED DESCRIPTION

The present invention relates to a 4-Stroke V-type 16-cylinder internal combustion engine equipped with lengthwise symmetric crankshaft. The current invention could be used in several applications like Mining, stationary power sources, Marine, etc. and for multiple engine variants like super-charged and turbocharged configurations.

Figure 1:
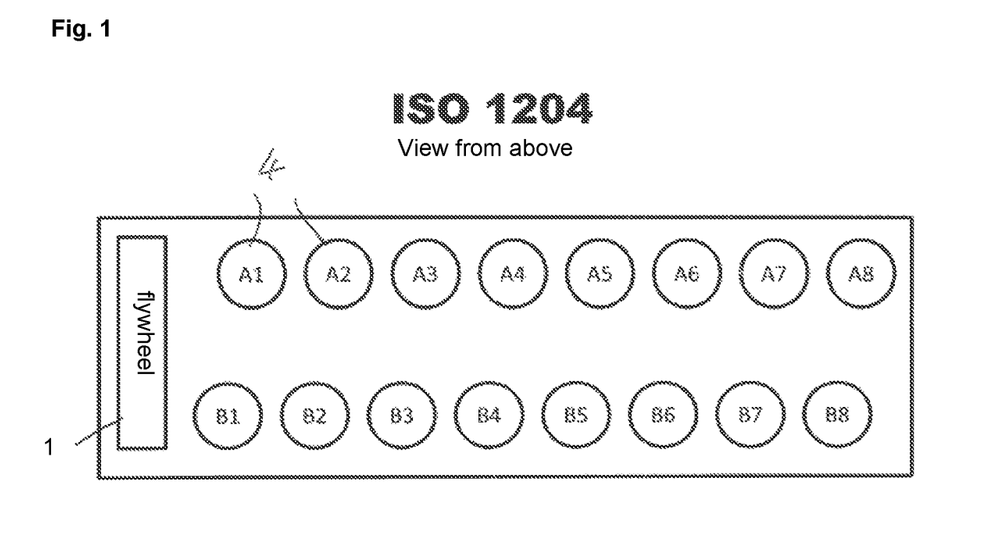
FIG. 1 shows a schematic drawing showing a 16 cylinder V-type engine and the cylinder numbering according to ISO 1204 used herein.

For constructional purposes, engine block geometry with V-angle of 60° was chosen, where each bank has 8 cylinders (4). Numbering of cylinders (4) of the engine (when seen from above) with the flywheel (1) arranged on the left hand side according to the DIN ISO 1204 is depicted in FIG. 1.

In the embodiment, the engine could e. g. have a brake power in the range of 2000 kW up to 3500 kW. The displacement of the engine could e. g. be between 60 l to 100 l. In the embodiment, the engine has an operating speed range from 600 rpm up to 2100 rpm, rotating in counter clockwise or in clockwise direction. The crankshaft of the engine is formed by a succession of 8 crank throws forming a crank star. There are 8 crank throws because the piston rods of the two cylinders of a V-segment are connected to the same crank throw. Further, a torsional vibration damper and a flywheel are attached on the crankshaft.

Crankshaft Loads

During engine operation, the crankshaft is subject to significant force loads caused by cylinder pressure and accelerations of piston and connecting rod, as well as the corresponding reaction forces in the main bearings. Besides quasi-static deformation of the crankshaft in terms of bending, torsion, and axial elongation, these forces can induce significant vibrational phenomena for the corresponding deformation shapes, which represent additional dynamic loads. Generally speaking, these dynamic loads correspond to a coincidence between combustion and/or inertial excitation frequencies and one or more crankshaft eigenfrequencies, with related torsional, bending or axial mode shape. High-speed Diesel engines are characterized by a wide operating speed range associated to multiple excitation harmonics, which makes it virtually impossible to avoid resonances.

The torque variation resulting from single cylinder combustion shifted by the firing sequence leads to an excitation of torsional vibrations of the crankshaft. In order to limit the torsional load of the crankshaft, almost all modern high-speed Diesel engines are equipped with a torsional vibration damper attached to the front end of the crankshaft. Nominal torsional stress is then calculated for the smallest diameter of a crank, which is typically the crank pin diameter. Oil bore holes located at the crank pin reduce the crankshaft's torsional strength and, typically, constitute the critical zone under pure torsional loading.

Crankshaft bending vibrations are generally well controlled by the main bearings being placed between each single crank. Nevertheless, significant bending effects can occur on both crankshaft ends. On the rear end, this is the case for heavy flywheels, couplings or single bearing generators in the framework of Electric-Diesel Powertrains. At the front end, very heavy torsional vibration dampers can also contribute significantly to bending vibrations. Whirling motion of the flywheel and/or the torsional vibration damper could be observed, which increases outer fillets' stresses. A typical solution for this problem is to increase bending stiffness of the outermost webs of the crankshaft, or to add support bearings to the affected crankshaft end.

Figure 2:
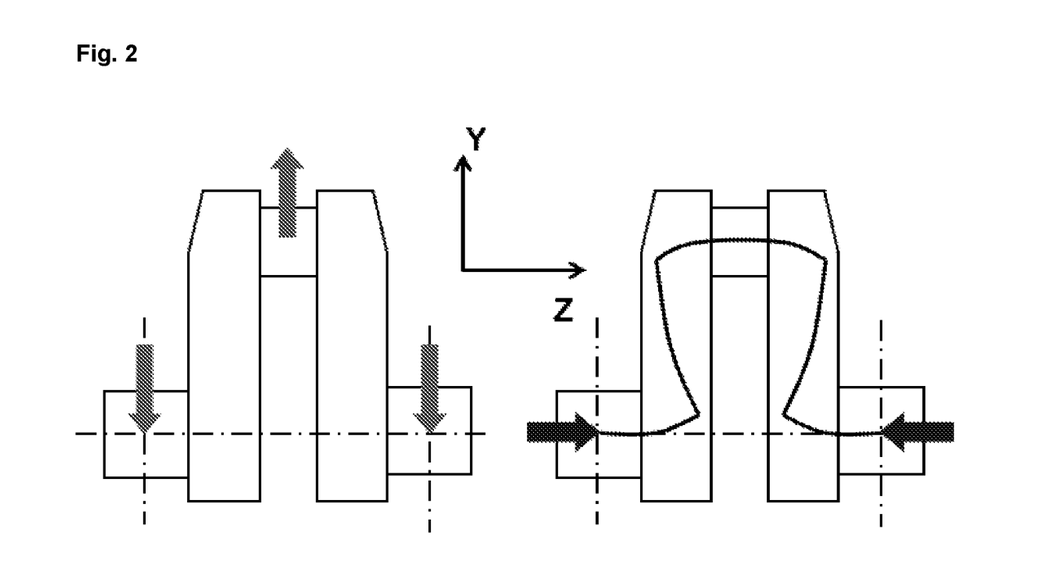
FIG. 2 shows a schematic drawing crankshaft axial dynamics and effect of radial forces.

As a third type of dynamic loading, axial vibrations represent a direct result of the crankshaft design and the attached masses, namely flywheel, coupling, torsional damper, and conrods. Here, the occurrence of axial resonances in the engine speed range leads to a succession of "lengthening" and "shortening" of the crankshaft, which is obviously characterized by a given amplitude and frequency, see FIG. 2. Operating under axial resonance results in excessive increase of fillet stresses as well as very high loads on the axial thrust bearing. Furthermore, high axial accelerations at the crankshaft's front end typically occur. Unlike technical measures to avoid torsional and bending dynamics, efficient solutions for controlling crankshaft axial vibration are not clearly identified in literature today. Axial vibration dampers are, consequently, rarely used in modern high-speed Diesel engines, and are always considered as encumbering devices from design space standpoint resulting in an extra cost for the project. Without understanding and controlling crankshaft axial behavior, its effect is considered by means of additional "unknown" stresses or increasing safety factor margins when analyzing fatigue results.

Excitation Spectrum

In general, excitation signal is given by the projection of all excitation forces on the mode shape. In case of axial vibration, the main contribution comes from radial crankpin forces. As for axial mode shape, radial displacement is almost identical for all crankpins, the corresponding modal excitation signal is given by the sum of all radial crankpin forces. The main influence on the signal is the V-angle of the engine, as it determines the phase shift between the single cylinder forces. The V60° cranktrain has a lengthwise symmetric crankshaft, and firing distance is given by 30°-60° sequences. Due to the non-equidistant firing intervals, the base order 4.0 has significant order amplitude. It has to be noticed that the zero order corresponds to static components of the excitation.

Figure 3:
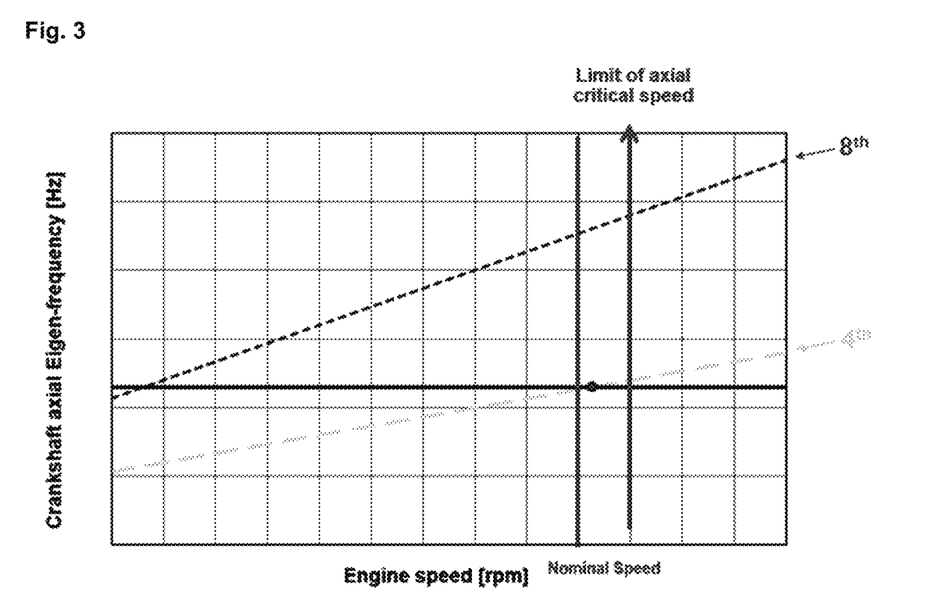
FIG. 3 shows Campbell Diagram of current V16-cylinder crankshaft for axial eigenmode; main excitation orders and critical axial speed.

In general, any resonance, i.e. coincidence between axial eigenfrequency and excitation frequency has to be avoided by an acceptable margin, called separation margin. For this purpose, the so-called Campbell diagram provides an excellent overview, and helps to identify critical speeds, see FIG. 3. From this picture, it is clear that first axial frequency of the crankshaft under consideration is excited by the major $4.0^{th}$ order excitation of the V60° cranktrain near to nominal engine speed, which has to be improved.

A resonance phenomenon occurs when the excitation coincides with an eigenmode in terms of shape and frequency. In order to avoid the occurrence of axial vibration resonances in engine speed range, it is thus possible to work on both sides, either on the excitation side (firing intervals), or on the response side (structural dynamics).

Improvement of Structural Dynamics

Modifications on the excitation side inherit, generally, many disadvantages for design, packaging, or load cycle dynamics. The only possibility being left is to introduce measures that aim to increase axial eigenfrequency. In order to discuss possible measures to improve crankshaft axial dynamics, some fundamentals of vibration mechanics are recalled first.

Figure 4:
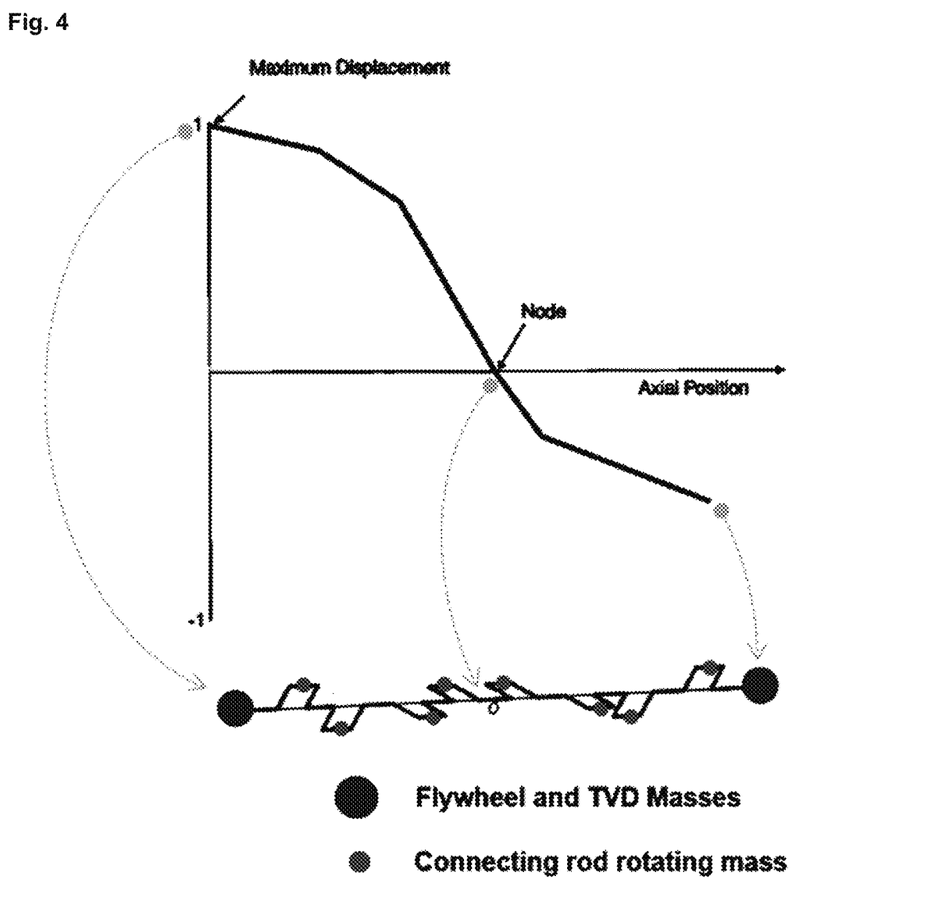
FIG. 4 shows representative "one-node" axial mode shape.

Generally, a vibration mode is characterized by a frequency and its related mode shape. Every mode shape contains vibration node(s) and anti-node(s), see FIG. 4. A node is a point that undergoes zero displacement, and is located at all points where the mode shape plot crosses the x-axis. An anti-node corresponds to the maximum normalized displacement. In the context of modal analysis, it is meaningless to refer to absolute displacements, as these result from the corresponding excitation, which is not considered at modal analysis. The only information that can be obtained from a mode shape is the relationship between the displacements at the various locations. Accordingly, in order to modify efficiently the frequency of a given mode shape, there are two possible alternatives: detune the stiffness near to a vibration node, or the mass near to an anti-node. Based on the definition of the frequency, these two alternatives are acting conversely. Thus, it can be deduced that an increase of crankshaft axial eigenfrequency could be achieved by stiffening the crankshaft near to the vibration node in the middle of the crankshaft, or by reducing the mass at antinode locations, i.e. at both ends.

The first crankshaft axial mode shape is characterized by a lengthening and shortening of the crankshaft like an "accordion". Therefore, the node is located near to the middle of the crankshaft. Both ends of the crankshaft constitute an anti-node location for the first axial mode shape.

The first measure to increase crankshaft's axial eigenfrequency consists of mass reduction of the components attached to crankshaft ends, namely the flywheel and the torsional vibration damper. For the flywheel, this is difficult to achieve, as a certain value of inertia has to be maintained in order to limit speed drop at dynamic load steps. On the front end, using lighter TVD is possible by means of different technology like leaf spring damper instead of viscous-type one. Nevertheless, this modification affects heavily crankshaft free end design (oil supply from engine), modifies torsional tuning, and finally ends up with significant increase of component cost. Accordingly, further alternatives have to be found calling for less severe impacts.

In order to shift axial resonance out of engine speed range, an increase of axial eigenfrequency of approximately 10 Hz is required. In a first step, local modifications of the web geometry are investigated, while main dimensions such as cylinder pitch, stroke, and pin diameter are kept constant. Here, it turned out that the potential is quite limited, and a maximum frequency shift of only 1 Hz can be achieved. This is not sufficient to shift the resonance out of the engine speed range.

Axial stiffness of a web depends not only on its thickness and width, but also on the angular positions of the neighboring cranks. Thus, the arrangement of the cranks along the crankshaft, the so-called crank star, has significant influence on the axial stiffness, and thus on the eigenfrequency. Basically, a V16-cylinder is built of a succession of 8 crank throws with an intermediate angle of 90° or 180°. Based on FEM analysis, it turned out that two consecutive crank throws with an intermediate angle of 90° have approximately 60% higher axial stiffness than two consecutive crank throws with an intermediate angle of 180°.

Figure 5:
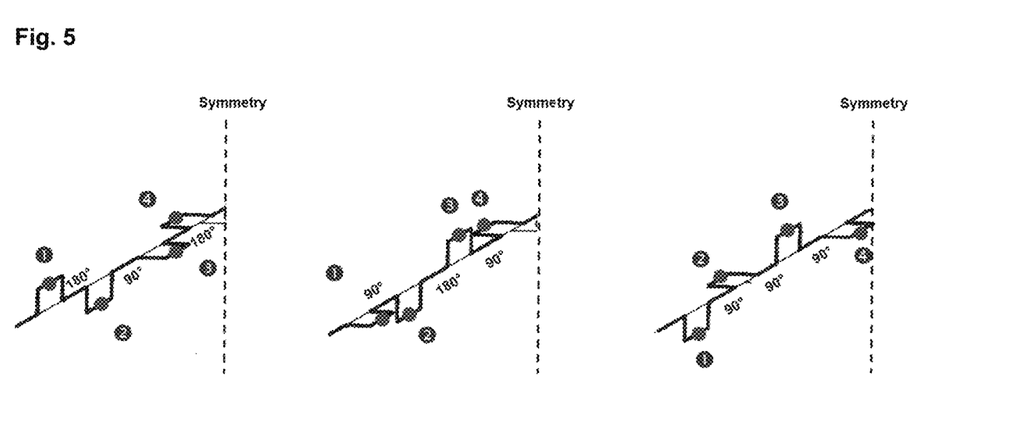
FIG. 5 shows half of the V16-cylinder crankshaft; left: current crank star with four occurrences of 180° intermediate angles; middle: crank star with four occurrences of 90° intermediate angles; right: crank star with only occurrences of 90° intermediate angles.

The current crankshaft has four crank throws with an intermediate angles of 180°, where two are located close to the critical location in the center, between crank 3/4 and 5/6, see FIG. 5 (left). From geometric point of view, it is also possible to build a crank star which has only 90° intermediate angles, and none with 180°, see FIG. 5 (right), and another crank star with only two intermediate angles of 180°, see FIG. 5 (middle). By considering the mirrors of these aforementioned three crank stars, the total conceivable six crank stars in the framework of V16-cylinder symmetric crankshaft are obtained.

Figure 6:
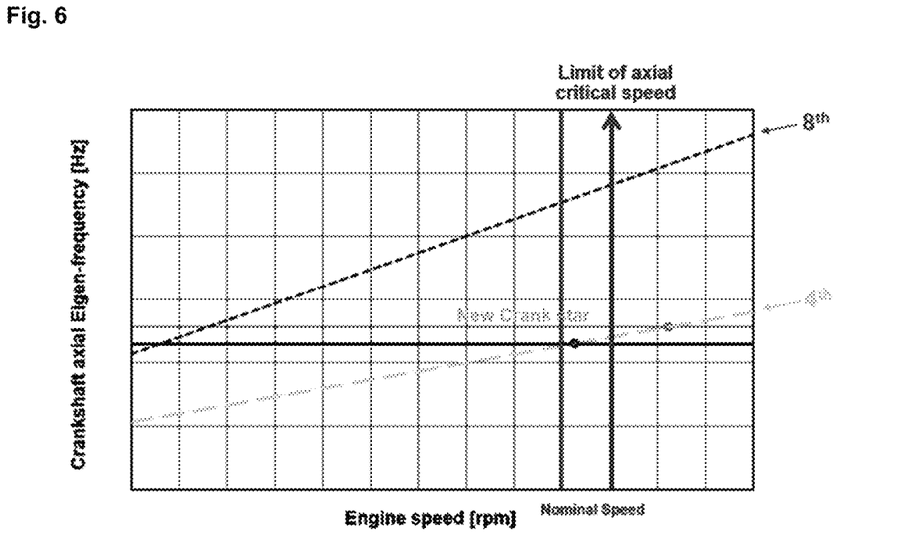
FIG. 6 shows Axial resonance for original and new crank star.

Based on the FEM analysis, it is recommended to avoid intermediate angles of 180° as much as possible. In FIG. 5 (middle) the position of the weak intermediate angle is located more outwards, between cranks 2/3 and 6/7, where the impact on axial eigenfrequency is less critical. Similarly, in FIG. 5 (right) the position of the intermediate angles of 90° between crank 3/4 and 5/6 results in the same axial stiffening effect. Because of axial stiffening with these four crank stars, an increase of eigenfrequency of 11 Hz is achieved. At first sight, this is perceived as a slight improvement. However, looking to the related critical speed, the axial resonance is shifted by 170 rpm to higher engine speeds, right outside the previously fixed target in terms of engine speed range, see FIG. 6.

On the remaining three crank stars, there are 384 possible firing sequences. Based on a multi-criteria optimization approach previously developed for a V20-cylinder engine, an appropriate firing sequence can be determined. Here, several criteria are considered, such as torsional dynamics, main bearing loads, gas cycle dynamics, drivetrain dynamic torque, crankshaft free end vibration, etc.

Figure 12:
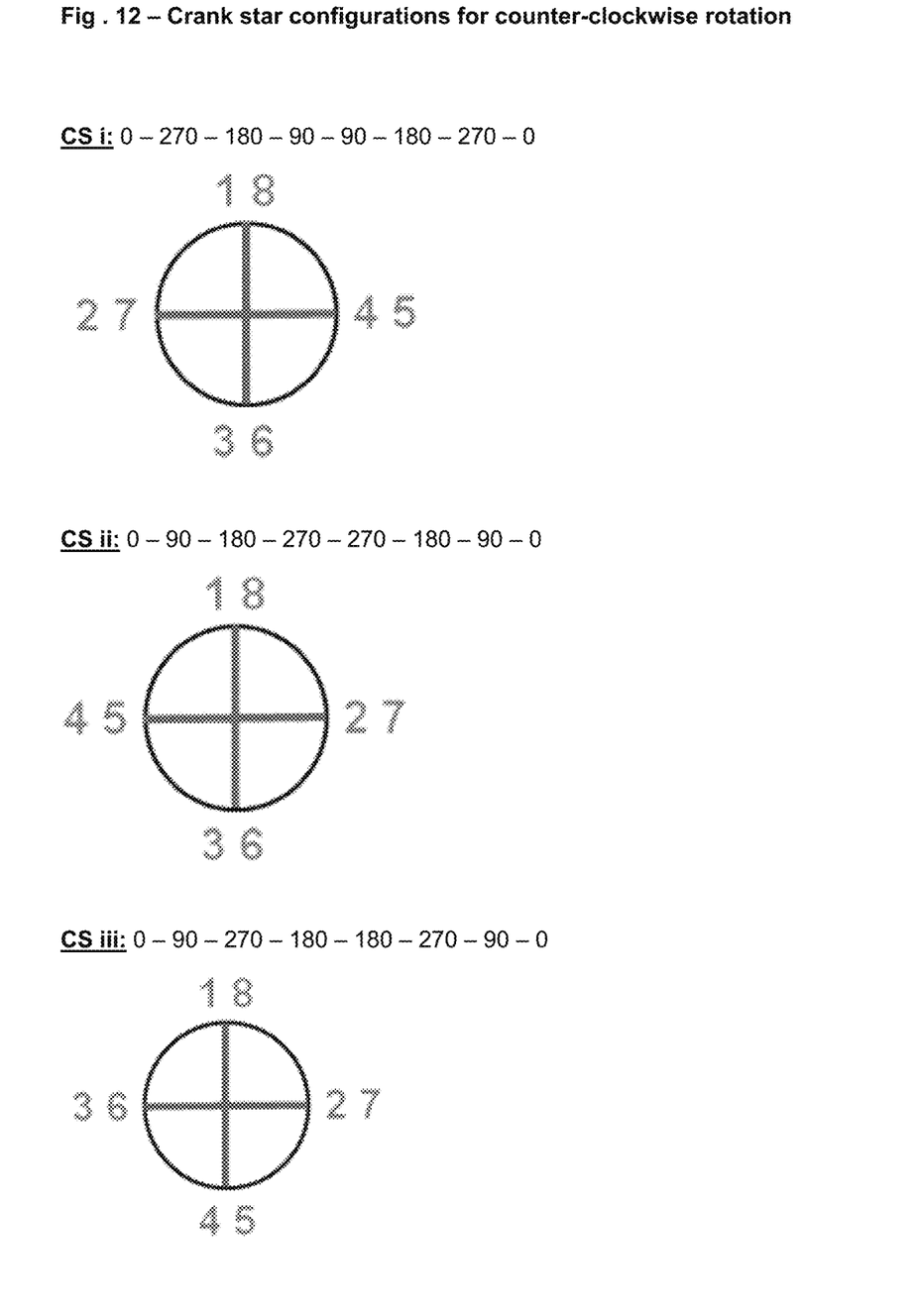
FIG. 12 shows a schematic drawing showing three crank stars of the present invention for counter-clockwise engine rotation and FIG. 13 shows a schematic drawing showing three crank stars of the present invention for clockwise engine rotation.
Figure 13:
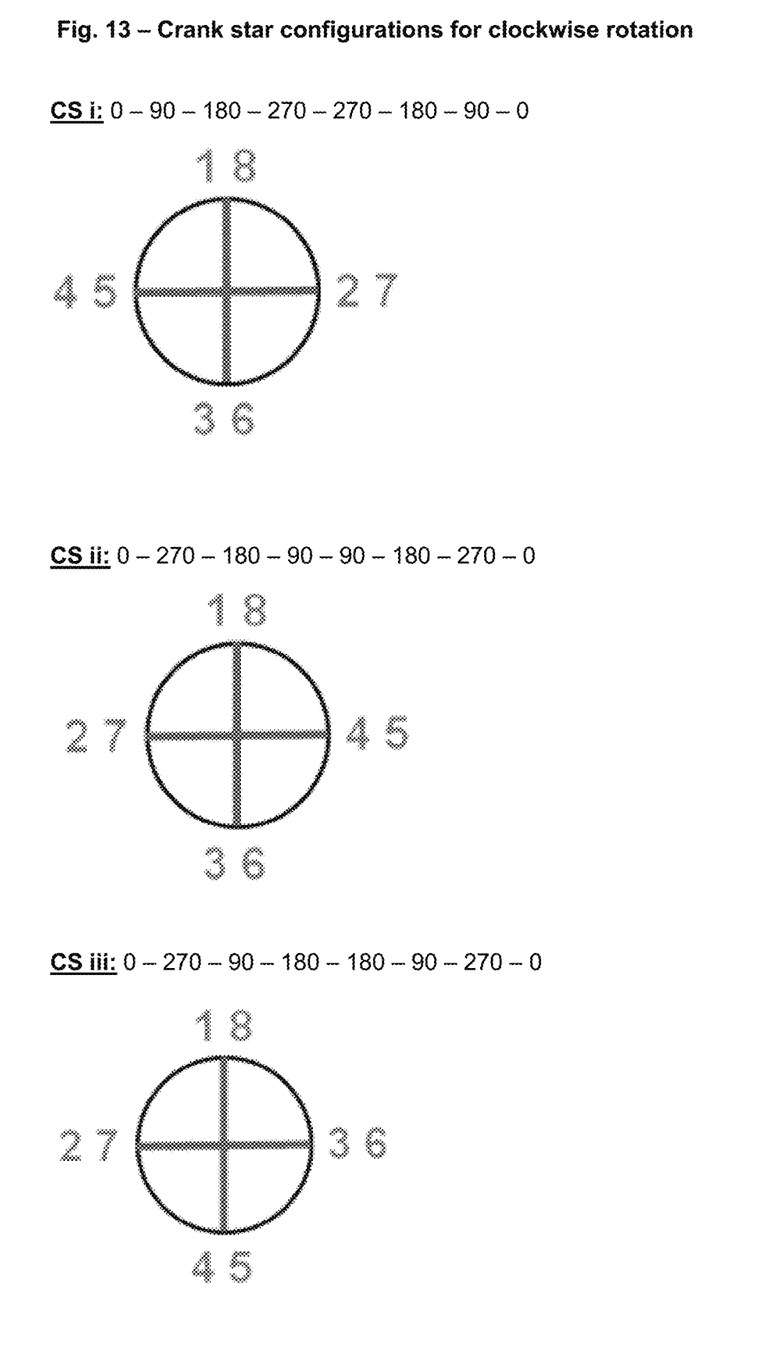

The three crank stars chosen, after finalizing the complete multi-modal analysis, for an engine with counter-clockwise rotation (when seen from the side of the flywheel) are shown in FIG. 12, the three crank stars chosen for an engine with clockwise rotation (when seen from the side of the flywheel) are shown in FIG. 13. The crank star discussed above is CS iii) from FIG. 12.

Firing Sequence Optimization

A key parameter for the design of multi-cylinder reciprocating internal combustion engines is the choice of an appropriate firing sequence. For engines with a small number of cylinders, like inline engines with up to 6 cylinders, and V-engines with up to 12 cylinders, the number of feasible sequences is rather low and well-described in literature. However, the number of possible sequences grows disproportionate to the number of cylinders, while the vibrational systems of crankshaft and engine block become more complex at the same time. Thus, the selection of appropriate firing sequences for such engines requires an in-depth understanding of the above mentioned aspects, and a systematic assessment based on optimization techniques is required. The claimed invention is a set of firing sequences for V16-cylinder engines with favorable properties regarding crankshaft torsional vibrations, gas cycle dynamics, main bearing loads, and engine operational vibrations. They are the result of an extensive study of a V16-cylinder engine, and can be applied to a class of V-type 16-cylinder engines for various applications.

Figure 7:
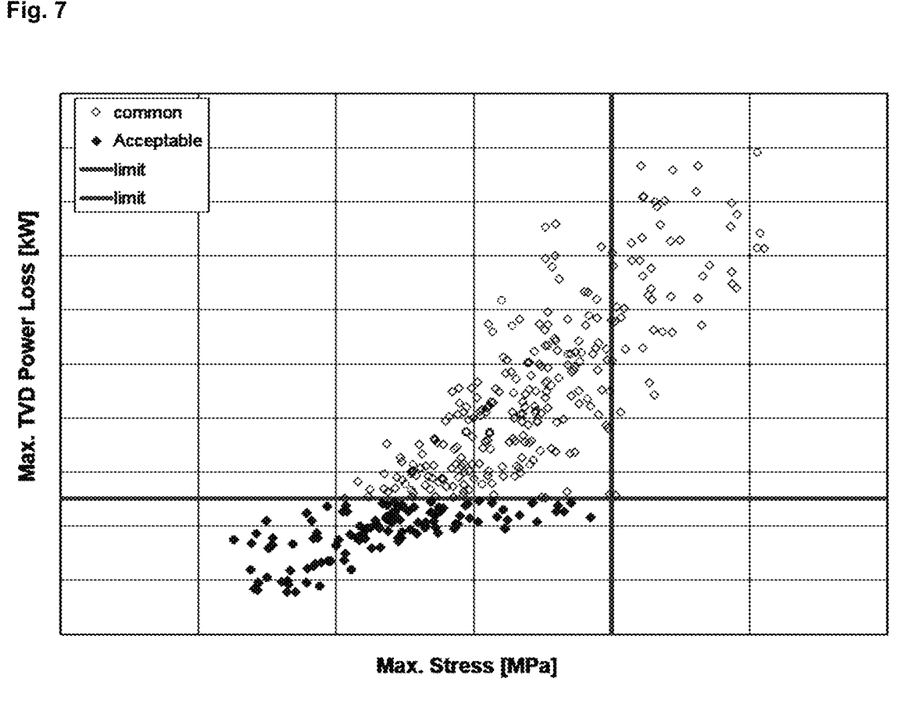
FIG. 7 shows Firing sequence optimization procedure— Crankshaft stress and TVD power loss criteria.

To keep this document under manageable length only some crankshaft dynamics influences are considered herein. The central role of the firing sequence of multi-cylinder engines for the torsional excitation is known and well understood in literature since 1930's. In FIG. 7, respecting crankshaft torsional stress and torsional vibration damper power loss limits, 117 firing sequences candidates were kept for further investigations.

Main Bearing Load

Figure 8:
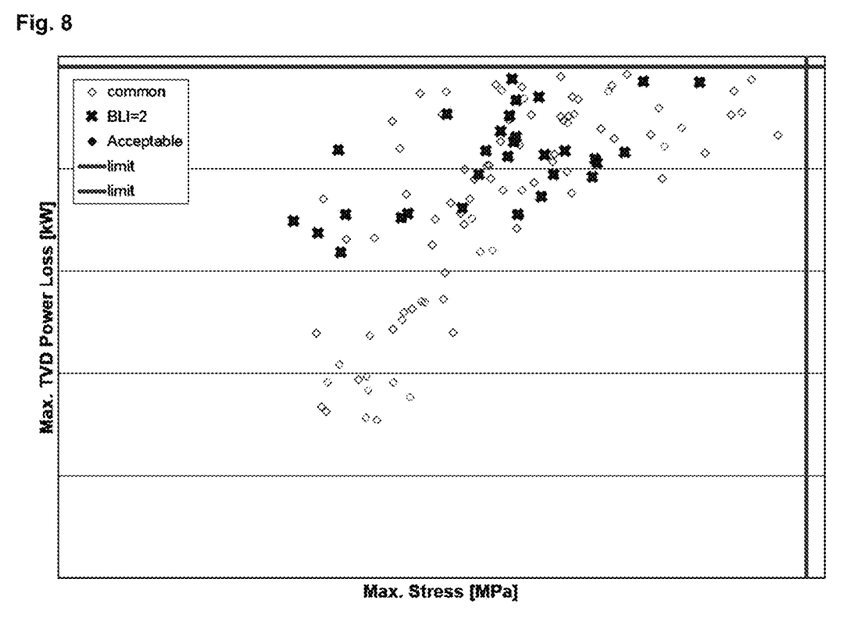
FIG. 8 shows Firing sequence optimization procedure— Main bearing load index criterion.

Wear and fatigue of crankshaft main bearings depends on many aspects and has to be assessed carefully during the development of the base engine. The firing sequence affects the main bearing load in several ways. Besides the contribution from cylinder pressure, the bearing peak force depends also on the mass balancing, which is determined by the crank star, and is thus depending on the chosen firing sequence. Additionally, a considerable bearing force is induced by the dynamic torsion of the crankshaft. The firing sequence decides whether this additional load is superposed in-phase with the peak firing load, or not. Furthermore, regarding thermal load of a bearing, it is advantageous to keep a certain time interval between two consecutive peak loads in order to allow for sufficient cooling by oil flushing. A simple measure for this is to regard the maximum number of consecutive peak loads on a bearing. This is called Bearing Load Index (BLI). While at engines with a V-angle smaller than the crank star angle, there can exist up to 4 peak loads in a series. In FIG. 8, from the remaining 117 candidates, 30 of them correspond to advantageous bearing load index.

Load Cycle Dynamics

In general, the filling of a cylinder depends strongly on the local pressure at the corresponding location in the intake manifold during the intake phase. This, however, depends strongly on the spatial distance which is kept to the previously fired cylinder on the same intake manifold. In order to achieve a well-balanced filling between the cylinders, it is recommended to keep a sufficiently large distance between consecutively fired cylinders on the same intake manifold. At the exhaust side, the situation is more complex, as the wave propagation of the exhaust gas can play an important role.

For the considered 16 cylinder V-engine, one single intake manifold per bank is planned. Therefore, in order to assess the intake related filling behavior, the minimum distance between consecutively fired cylinders of the same bank is evaluated. When using this indicator, all remaining firing sequences have the same value. More detailed analysis using 1D thermodynamic simulation, shows advantageous candidates in terms of air filling efficiency deviation for the 16 cylinders.

So far, optimisation procedure was performed for only one application. Reproducing this procedure for all applications results in a set of 5 firing sequences which can be used. In the remaining section, only the best candidate will be analysed by means of Multibody simulations.

Multibody Simulation of Selected Solution

Several approaches are described in literature dealing with multibody modeling of cranktrains in the framework of internal combustion engines. One of them is the so-called "Hybrid model", which allows for the construction of fully coupled cranktrain models in commercial multibody dynamics codes. This approach combines FEM, MBS and fatigue assessment within a well-established procedure. Accordingly, it provides a modeling platform for detailed assessment of the crankshaft, as an example. The method of Components Mode Synthesis (CMS, Craig-Bampton method) is used to reduce the number of coordinates required to describe the component deformation. This transforms the problem from the "nodal" description (FEM) to a reduced basis, which associates accurate dynamic behavior to low number of degree of freedom.

The integration of component flexibility is a necessary task if one wants to capture dynamic effects, which occur at high speed engines. According to the popular floating frame of reference approach, the motion of each flexible body is subdivided into a reference motion, which can be described according to rigid body formalism, and a deformation. Therefore, the FEM is commonly used to describe such a deformation by means of small displacements and rotations. Based on that, the V16-cylinder crankshaft is modeled using a flexible body.

Figure 9:
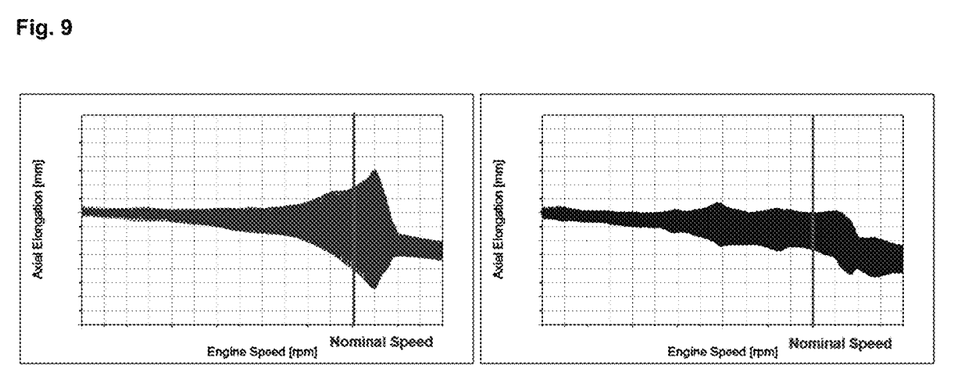
FIG. 9 shows V16-cylinder crankshaft axial elongation; left: original crank star; right: new crank star.

Here, it can be observed that the axial elongation of the new crank star shows no resonance in the engine speed range, see FIG. 9 (right). As a consequence, the maximum elongation is significantly reduced by approximately 300% compared to the original design.

Figure 10:
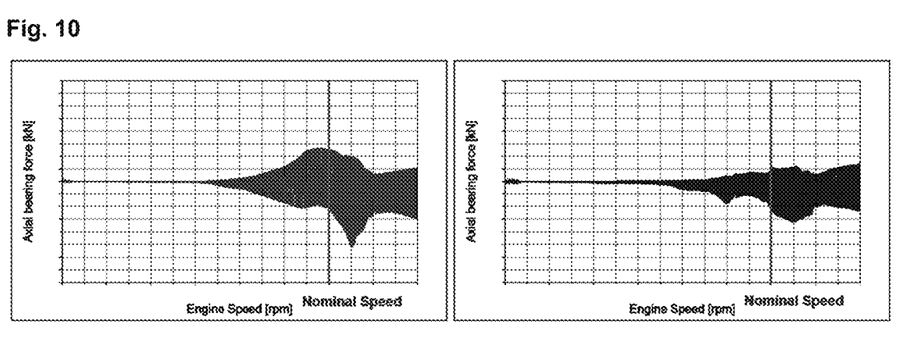
FIG. 10 shows V16-cylinder crankshaft axial bearing force; left: original crank star; right: new crank star.

In general, axial resonance conditions go along with a severe increase of forces in axial thrust bearing, causing increased wear and damage, see FIG. 10. Here, the new crankshaft shows significantly lower force values due to absence of resonance.

Figure 11:
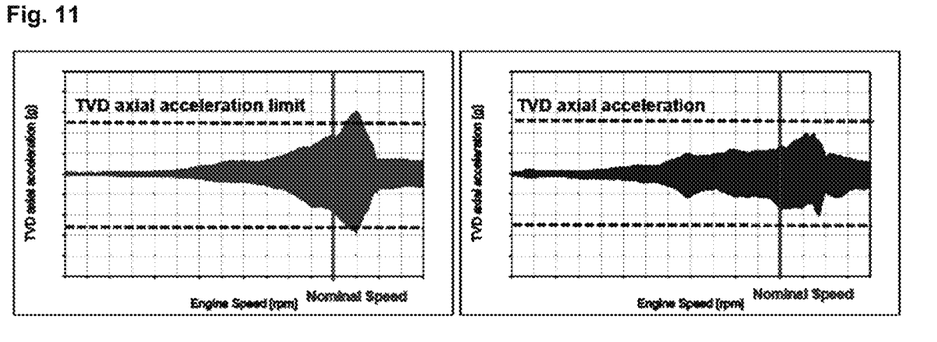
FIG. 11 shows axial acceleration of torsional vibration damper; left: original crank star; right: new crank star.

A further critical point is the axial acceleration of the torsional vibration damper. Both structural fatigue strength as well as function of a viscous damper require to limit the axial accelerations to a certain value. Under resonance conditions, this limit is exceeded significantly, see FIG. 11 (left). For the new crank star, the axial acceleration is reduced by more than 30%, and the given limit is respected all over the engine speed range.

Figure 14:
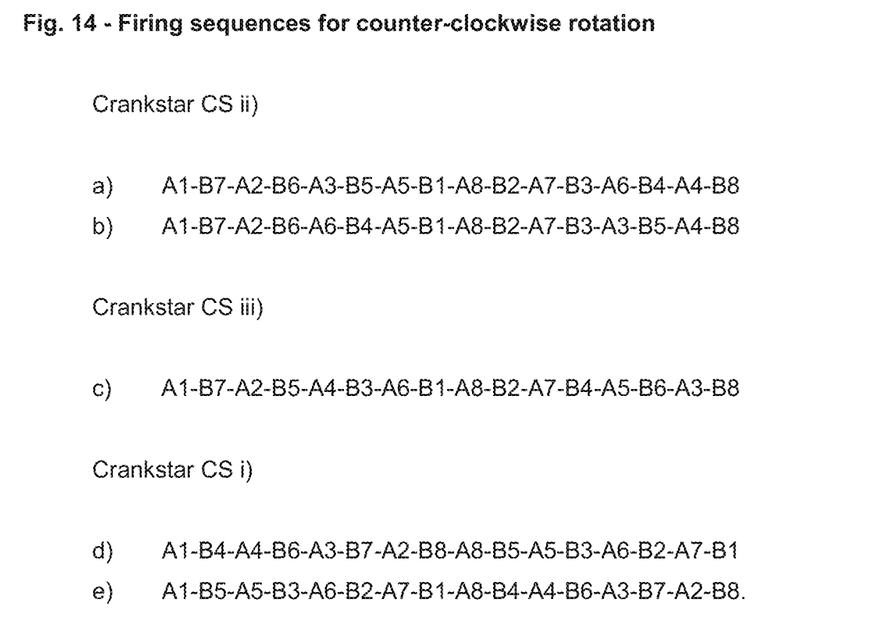
FIG. 14 shows firing sequences for counter-clockwise rotation.
Figure 15:
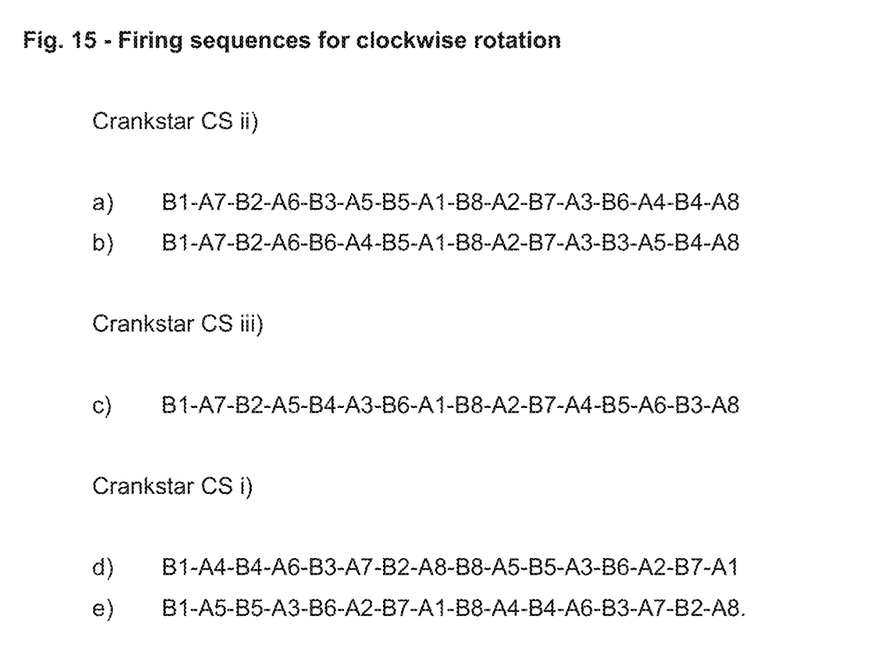
FIG. 15 shows firing sequences for clockwise rotation.

After finalizing the multi-criteria optimization, the firing sequences shown in FIG. 14 were determined for engines with counter-clockwise rotation, and the firing sequences shown in FIG. 15 were obtained for engines with clockwise rotation. FIGS. 14 and 15 further indicate the corresponding crank stars from FIGS. 12 and 13, respectively.

The invention claimed is:

1. A V-type 4-stroke internal combustion engine with 16 cylinders, having a counter-clockwise direction of rotation, comprising a firing sequence controller that fires the cylinders A1 to A8 and B1 to B8 in at least one of the following firing sequences, wherein the direction of rotation and cylinder numbering is defined in accordance with DIN ISO 1204:
   a) A1-B7-A2-B6-A3-B5-A5-B1-A8-B2-A7-B3-A6-B4-A4-B8
   b) A1-B7-A2-B6-A6-B4-A5-B1-A8-B2-A7-B3-A3-B5-A4-B8
   c) A1-B7-A2-B5-A4-B3-A6-B1-A8-B2-A7-B4-A5-B6-A3-B8
   d) A1-B4-A4-B6-A3-B7-A2-B8-A8-B5-A5-B3-A6-B2-A7-B1
   e) A1-B5-A5-B3-A6-B2-A7-B1-A8-B4-A4-B6-A3-B7-A2-B8.

2. The V-type 4-stroke internal combustion engine according to claim 1, further comprising a crankshaft, a torsional vibration damper and a flywheel arranged on the crankshaft, wherein the crankshaft has 8 crank throws forming a crank star, wherein in each case piston rods of two cylinders of the v-segment are connected to the same crank throw, wherein the crank star is of a lengthwise symmetric or lengthwise quasi-symmetric type, wherein the crank throws C1 to C8 have one of the following angular sequences in the direction of rotation of the engine when seen from a side of the flywheel, with the crank throws numbered as C1 to C8 when starting from the side of the flywheel:
   i) C1,C8-C2,C7-C3,C6-C4,C5,
   ii) C1,C8-C4,C5-C3,C6-C2,C7, or
   iii) C1,C8-C3,C6-C4,C5-C2,C7, wherein a combination of firing sequence and crank star is one of the following:
   crank star i), one of the firing sequences d or e,
   crank star ii), one of the firing sequences a or b, or
   crank star iii), firing sequence c.

3. The V-type 4-stroke internal combustion engine according to claim 1, wherein the firing sequences have an angular firing distance for a firing of a cylinder of the B-bank followed by a firing of a cylinder of the A-bank of between 45° and 75°, and/or wherein the firing sequences have an angular firing distance for a firing of a cylinder of the A-bank followed by a firing of a cylinder of the B-bank of between 15° and 45°.

4. The V-type 4-stroke internal combustion engine according to claim 1, wherein the engine is a suction engine or has a charging system having one or several stages, and/or wherein all cylinders of one cylinder bank have a common intake manifold and/or a common exhaust manifold, wherein the exhaust manifolds are arranged with respect to the V-angle on an inside and the intake manifolds are arranged with respect to the V-angle on an outside.

5. The V-type 4-stroke internal combustion engine according to claim 1, wherein the engine is used as a power unit in a heavy duty and/or mining and/or earth moving and/or transport and/or cargo and/or load handling machine, and/or wherein the engine is used to run a generator and/or a hydraulic pump, the generator and/or the hydraulic pump operating one or more drives of an undercarriage and/or working equipment of a heavy duty and/or mining and/or earth moving and/or transport and/or cargo and/or load handling machine, and/or wherein the engine is coupled directly or via a mechanical gear train to an undercarriage and/or working equipment of a heavy duty and/or mining and/or earth moving and/or transport and/or cargo and/or load handling machine, and/or wherein the engine is used as the main power unit for a ship and/or a train, and/or wherein the engine is used as a power unit in military equipment and/or for fluid transport and/or for gas and/or fuel production and/or treatment, and/or wherein the engine is used as a power unit for power generation, and/or wherein the engine is used as a power unit for a mobile and/or stationary machine, and/or wherein the engine is coupled torsionally stiffly and/or via a torsionally elastic coupling to the load.

6. A firing sequence controller or software for the V-type 4-stroke internal combustion engine according to claim 1, the firing sequence controller or software implementing at least one of the firing sequences provided in claim 1.

7. A V-type 4-stroke internal combustion engine with 16 cylinders, having a clockwise direction of rotation, comprising a firing sequence controller that fires the cylinders A1 to A8 and B1 to B8 in at least one of the following firing sequences, wherein the direction of rotation and cylinder numbering is defined in accordance with DIN ISO 1204:
  a) B1-A7-B2-A6-B3-A5-B5-A1-B8-A2-B7-A3-B6-A4-B4-A8
  b) B1-A7-B2-A6-B6-A4-B5-A1-B8-A2-B7-A3-B3-A5-B4-A8
  c) B1-A7-B2-A5-B4-A3-B6-A1-B8-A2-B7-A4-B5-A6-B3-A8
  d) B1-A4-B4-A6-B3-A7-B2-A8-B8-A5-B5-A3-B6-A2-B7-A1
  e) B1-A5-B5-A3-B6-A2-B7-A1-B8-A4-B4-A6-B3-A7-B2-A8.

8. A firing sequence controller or software for the V-type 4-stroke internal combustion engine according to claim 7, the firing sequence controller or software implementing at least one of the firing sequences provided in claim 7.

9. The V-type 4-stroke internal combustion engine according to claim 7, further comprising a crankshaft, a torsional vibration damper and a flywheel arranged on the crankshaft, wherein the crankshaft has 8 crank throws forming a crank star, wherein in each case piston rods of two cylinders of the v-segment are connected to the same crank throw, wherein the crank star is of a lengthwise symmetric or lengthwise quasi-symmetric type, wherein the crank throws C1 to C8 have one of the following angular sequences in the direction of rotation of the engine when seen from a side of the flywheel, with the crank throws numbered as C1 to C8 when starting from the side of the flywheel:
  i) C1,C8-C2,C7-C3,C6-C4,C5,
  ii) C1,C8-C4,C5-C3,C6-C2,C7, or
  iii) C1,C8-C3,C6-C4,C5-C2,C7,
wherein a combination of firing sequence and crank star is one of the following:
  crank star i), one of the firing sequences d or e,
  crank star ii), one of the firing sequences a or b, or
  crank star iii), firing sequence c.

10. The V-type 4-stroke internal combustion engine according to claim 7, wherein the firing sequences have an angular firing distance for a firing of a cylinder of the A-bank followed by a firing of a cylinder of the B-bank of between 45° and 75°, and/or wherein the firing sequences have an angular firing distance for a firing of a cylinder of the B-bank followed by a firing of a cylinder of the A-bank of between 15° and 45°.

11. A V-type 4-stroke internal combustion engine having 16 cylinders, having a counter-clockwise or clockwise direction of rotation, comprising a crankshaft, a torsional vibration damper and a flywheel arranged on the crankshaft, wherein the crankshaft has 8 crank throws forming a crank star, wherein in each case piston rods of two cylinders of a V-segment are connected to the same crank throw, wherein the crank star is of a lengthwise symmetric or lengthwise quasi-symmetric type, wherein the crank throws C1 to C8 have one of the following angular sequences in the direction of rotation of the engine when seen from a side of the flywheel, with the crank throws numbered as C1 to C8 when starting from the side of the flywheel:
  i) C1,C8-C2,C7-C3,C6-C4,C5,
  ii) C1,C8-C4,C5-C3,C6-C2,C7 or
  iii) C1,C8-C3,C6-C4,C5-C2,C7.

12. The V-type 4-stroke internal combustion engine according to claim 11, wherein the V-angle is between 40° and 80°.

13. The V-type 4-stroke internal combustion engine according to claim 11, wherein an angular difference between two crank throws having the same distance from a middle plane of the crankshaft is below 5°, and/or wherein on both halves of the crankshaft, the angular distance between two crank throws following each other is between 80° and 100° or between 170° and 190°.

14. The V-type 4-stroke internal combustion engine according to claim 11, wherein the crank shaft is made from a self-ageing, micro-alloyed steel, and/or comprising a torsional vibration damper, wherein the power dissipation of the torsional vibration damper is below 6 per mil of the maximum engine power, and/or wherein the torsional vibration damper is a viscous damper, and/or wherein the torsional vibration damper is arranged on an opposite side of the crankshaft from the flywheel.

15. The V-type 4-stroke internal combustion engine according to claim 11, wherein a displacement volume per cylinder is between 2 l and 15 l, and/or wherein the maximum engine power per liter displacement volume is between 10 kW and 80 kW, and/or wherein the engine has an operating speed range of between 600 and 2100 rpm, and/or wherein the engine has an engine controller programmed to run the engine at a constant nominal operating speed, wherein the constant nominal operating speed is adaptable based on engine conditions and/or load conditions, and/or wherein the constant nominal operating speed is from an operating speed range between 600 and 2100 rpm, and/or wherein the engine is operable with a gaseous and/or with liquid fuels, wherein the engine is operable with at least one of the following fuels: gas, diesel, gasoline; and/or wherein the engine has a direct injection system and/or a high pressure injection system, and/or wherein the engine can be operated with a Diesel or an Otto combustion method, and/or wherein the engine controller is programmed to operate the engine with a homogeneous charge and/or stratified charge combustion method.

16. A machine comprising the V-type 4-stroke internal combustion engine according to claim 11, wherein the machine is a heavy duty and/or mining and/or earth moving and/or transport and/or cargo and/or load handling machine, and/or ship and/or train and/or military and/or fluid transport and/or gas and/or oil production and/or treatment machine and/or power generator.

17. A crank star for the V-type 4-stroke internal combustion engine according to claim 11.

18. The V-type 4-stroke internal combustion engine according to claim 12, wherein the V-angle is at 60°.

* * * * *